(12) United States Patent
Golightly

(10) Patent No.: US 6,546,984 B1
(45) Date of Patent: Apr. 15, 2003

(54) TIRE BEAD AND ITS METHOD OF MANUFACTURE

(75) Inventor: Ralph Wayne Golightly, Gadsden, AL (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/890,182
(22) PCT Filed: Mar. 12, 1999
(86) PCT No.: PCT/US99/05529
§ 371 (c)(1),
(2), (4) Date: Jul. 26, 2001
(87) PCT Pub. No.: WO00/54964
PCT Pub. Date: Sep. 21, 2000
(51) Int. Cl.[7] .......................... B29D 30/48; B60C 15/04
(52) U.S. Cl. ........................ 152/540; 156/136; 156/422
(58) Field of Search ............................... 156/136, 422, 156/130.7, 135; 152/539, 540; 245/1.5

(56) References Cited

U.S. PATENT DOCUMENTS

| 1,819,747 | A | 8/1931 | Harrah |
| 1,913,336 | A | 6/1933 | MacMonagle |
| 1,943,272 | A | 1/1934 | Lerch |
| 1,943,273 | A | 1/1934 | Lerch |
| 2,149,079 | A | 2/1939 | White et al. |
| 2,902,083 | A | 9/1959 | White |
| 4,938,437 | A | 7/1990 | Rausch |
| 5,385,621 | A | 1/1995 | Golightly |
| 5,567,269 | A | 10/1996 | Golightly |

FOREIGN PATENT DOCUMENTS

| GB | 2325200 | 11/1998 |

*Primary Examiner*—Geoffrey L. Knable
(74) *Attorney, Agent, or Firm*—Howard M. Cohn

(57) ABSTRACT

The present invention provides a method of making a tire bead (16) with a tape (10) composed of two parallel wires (12a, 12b) having a coating (28) of resilient elastomeric material and connected by a web (14). The tire bead (16) can be built by winding the tape (10) in side by side relation and in successive superposed layers of predetermined widths and with convolutions spanning superposed layers to provide the tire bead (16) of predetermined cross-sectional area.

5 Claims, 3 Drawing Sheets

TIRE BEAD AND ITS METHOD OF MANUFACTURE

TECHNICAL FIELD

The present invention generally relates to wire fabrics and structures. More particularly, this invention relates to tire beads and their methods of manufacturing.

BACKGROUND OF THE INVENTION

A tire bead is that part of a tire which anchors the tire onto a wheel's rim. It is essentially an annular tensile member or inextensible hoop. Every tire has two such beads which are located within the rubber which makes up the inner-most circumference on each side of the tire.

In the usual procedure for manufacturing tire beads, the ends of individual wires, the exteriors of which are often rubber coated, are fed into a tire bead making machine. Machines of this type are old and well known in the tire building art.

Typical machines of this type are disclosed in U.S. Pat. Nos. 1,913,336, 2,902,083 and 5,385,621. These machines comprise a rotating drum about which the wire is wrapped a predetermined number of turns, dependent upon the strength and/or cross-sectional area of the tire bead desired. Standard equipment on such machines includes the means for automatically introducing the leading end of the wire into a gripper on the drum, intermittently operated means for rotating the drum, a stacking device which moves the incoming wire so as to control and build-up the cross-sectional shape of the resulting tire bead, and a knife to sever the incoming wire at the end of each building cycle. During the pause in the rotation of the drum, the finished tire bead is ejected laterally from the drum.

One deficiency of conventional tire bead making machines is their relatively slow operating speeds and consequently the amount of time required to fabricate a tire bead. To overcome this deficiency, various methods have been attempted to feed such tire bead machines a strap comprised of four parallel wires held together by a coating of rubber or other elastomeric material. A rectangular cross-sectional shaped tire bead formed using a standard style strap is shown in FIG. 1.

However, because such straps are not pliable, their use has been seen to severely limit the range of cross-sectional shapes of the tire beads which can be built-up by using them. For example, a conventional hex cross-sectional shaped tire bead, see FIG. 2, which is commonly used in the tire industry, cannot be built up using the types of straps shown in FIG. 1. Also, by increasing the number of wires forming each bead, the strength of the bead is reduced.

Another deficiency of conventional tire bead making machines is the problem associated with how to deal with the cut ends of the resulting tire bead. The springback nature of the wire ends can result in their coming loose and causing wire misalignments which can result in an unacceptable number of manufacturing interruptions in order to restring and realign the wires.

Thus, despite the prior art, there still exists a need for more efficient tire bead manufacturing processes.

OBJECTS OF THE INVENTION

It is an object of the present invention to provide a more efficient tire bead manufacturing process as defined in one or more of the appended claims and as such, having the capability of accomplishing one or more of the following subsidiary objects.

An object of the present invention is to provide a method of constructing a tire bead with a strap containing two parallel wires enmeshed in an elastomeric material.

Still another object of the present invention is provide a new and improved type of tire bead formed of the strap of two parallel wires.

Other objects and advantages of this invention will become readily apparent as the invention is better understood by reference to the accompanying drawings and the detailed description that follows.

SUMMARY OF THE INVENTION

The present invention is generally directed to satisfying the needs set forth above and the problems identified with prior tire bead manufacturing processes. Prior problems, associated with low operating efficiencies for tire bead machines are resolved by the present invention.

In accordance with one preferred embodiment of the present invention, the foregoing need can be satisfied by providing a method of making a tire bead characterized by the steps of forming a tape composed of a plurality of parallel wires coated with a resilient elastomeric material, the elastomeric material connecting adjoining parallel wires by a web formed between the wires, the web being of a predetermined size so as to yield the tape sufficiently pliable so as to allow the tape to be positioned to build up a tire bead having the same cross-sectional areas that can be built using individual wires, and forming a tire bead by winding such a tape a predetermined number of superimposed convolutions.

In another preferred embodiment, the present invention is seen to take the form of the above described method wherein the winding of the tape proceeds with the convolutions of the tape being laid in side by side relation and in successive superposed layers of predetermined widths to provide a tire bead of predetermined cross-sectional area.

In another preferred embodiment, the present invention is seen to take the form of a tire bead formed by any of the above described methods.

BRIEF DESCRIPTION OF THE DRAWINGS

The structure, operation, and advantages of the invention will become further apparent upon consideration of the following description taken in conjunction with the accompanying drawings, wherein.

DEFINITIONS

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

DETAILED DESCRIPTION OF THE PREFERRED EMBODIMENT

Figure 1:
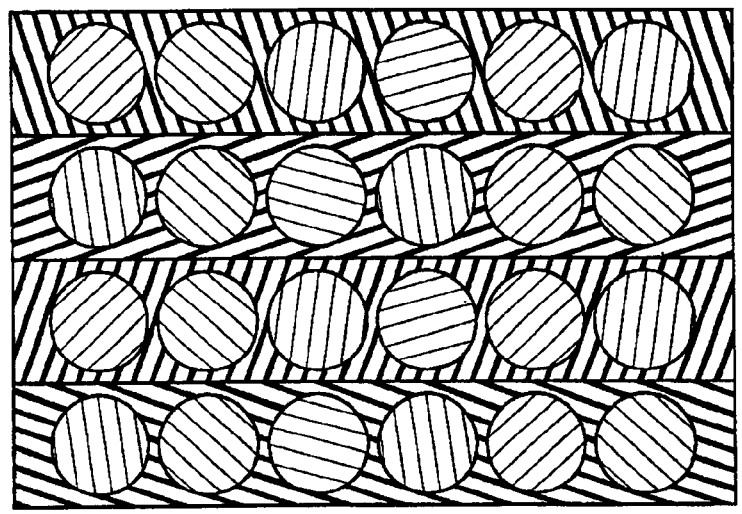
FIG. 1 is the cross-sectional view of a conventional tire bead fabricated by layering four straps, each of which consists of six parallel wires enmeshed in a rubber coating.
Figure 2:
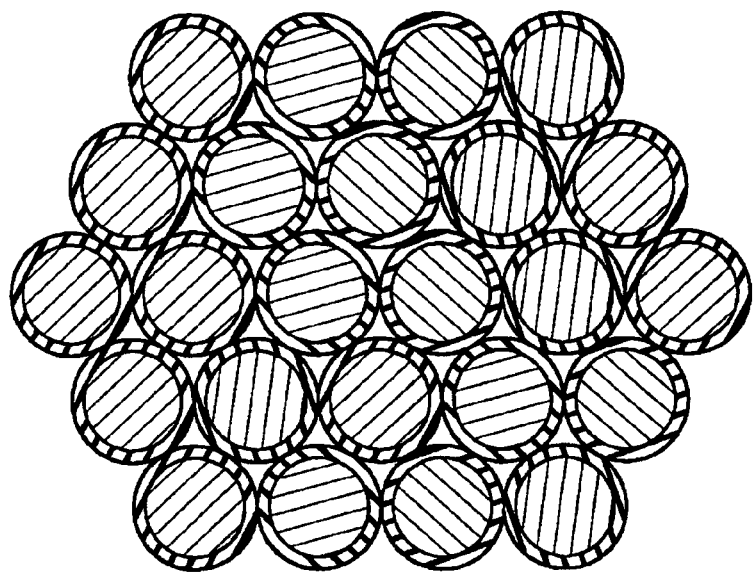
FIG. 2 is a cross-sectional view of a conventional hex cross-sectional shaped tire bead.
Figure 3:
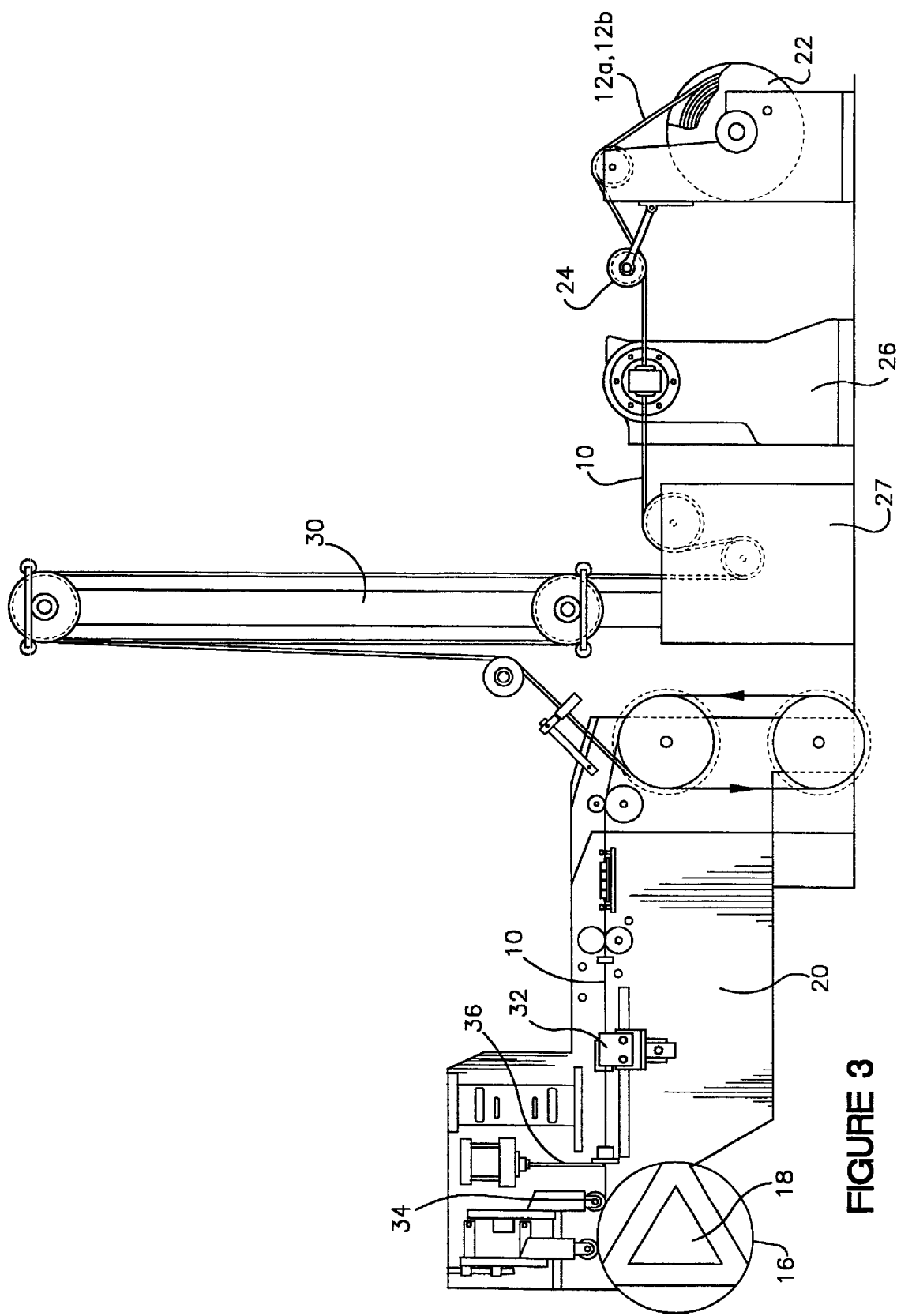
FIG. 3 is a side view of a tire bead manufacturing process according to the present invention.

Referring now to the drawings wherein are shown preferred embodiments of the present invention and wherein like reference numerals designate like elements throughout, there is shown in FIG. 3 a side view of a tire bead manufacturing process according to the present invention.

Figure 4:
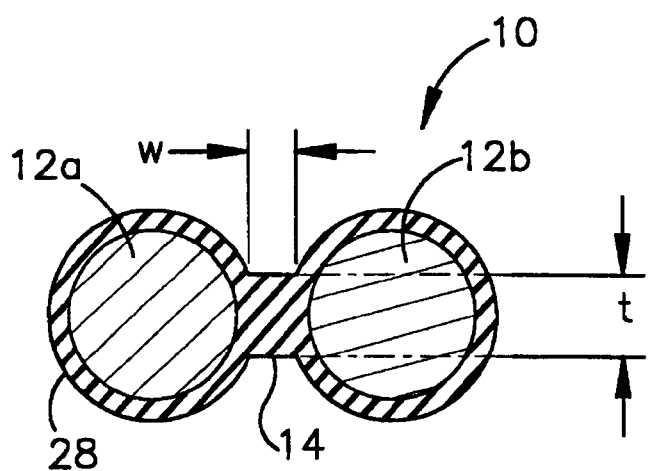
FIG. 4 is a cross-sectional view of a tire bead tape according to the present invention.

This embodiment is seen to comprise the steps of providing a tape 10, as shown in FIG. 4, composed of a plurality of parallel wires 12a,12b coated with a resilient elastomeric material. The elastomeric material connects the adjoining parallel wires by a web 14 formed between the wires. The web 14 is of a predetermined size so as to yield the tape sufficiently pliable to allow the tape to be bent to build up the same cross-sectional areas that can be built up using individual wires. Tire beads 16 are formed by winding the tape 10 a predetermined number of superposed turns around the drum 18 of the tire bead machine 20.

The tire bead manufacturing process of FIG. 3 is seen to comprise a plurality of large creels 22 which supply individual wires 12a,12b. These creels are arranged side-by-side so that only one shows in FIG. 3. The individual wires 12a,12b are drawn from the creels 22 and passed into a spacing device 24, such as a grooved guide roller, which serves to bring the wires into parallel alignment in a single horizontal plane, this being the basis for the eventual tape which these wires will comprise. The wires are next drawn through a tubing machine 26 where a coating 28 of elastomeric material, as shown in FIG. 4, is forced around and between the separate wires 12a,12b to coat the wires while forming a web 14 of predetermined size between the adjoining wires. A set of dies and inserts for the tubing machine's extruder are used to create the web's precise dimensions. The tubing machine is of any standard make and does not make up a part of the present invention.

See FIG. 4 for a cross-sectional view of the resulting tape 10 after it has passed through a cooling section 27 which is used set the elastomeric material. The tape 10 has a coating 28 about the wires 12a,12b and a web 14 interconnecting the coated wires 12a,12b. The web 14 has a thickness "t" and a width "w" which depends on the specific application. While tape 10 as shown, can be formed with two parallel wires, it is also within the terms of the present invention to form the tape of more wires, such as 6 or 8, embedded in elastomeric material and then slice the tape into a plurality of tapes of two wires embedded in rubber having a web therebetween.

In order to permit continuous operation of this process, a festooning storage device 30 is placed after the cooling section 27. The tape from the festooning device 30 is wound upon the drum 18 of the tire bead making machine 20. The tire bead making machine 20 has all the standard equipment usually included on such machines, including the mechanical components 32 for automatically introducing the leading end of the tape 10 into a gripper (not shown) on the drum 18, and for intermittently rotating the drum. A stacking device 34 of conventional design moves the incoming tape 10 so as to control and build-up the cross-sectional shape of the resulting tire bead. A knife 36 severs the incoming tape at the end of each building cycle. During the pause in the rotation of the drum 18, the finished tire bead 16 is ejected laterally from the drum.

Table I below shows preferred parameters for the webs 14 formed when various sizes of round steel wires are used in manufacturing the tapes 10 from which the tire beads are formed:

TABLE I

| Wire Diameter (in) | Elastomeric Material | Coating Thickness (in) | Web Thickness (in) | Web Width (in) |
|---|---|---|---|---|
| 0.050 | Rubber | 0.005 | 0.020–0.025 | 0.010 |
| 0.072 | Rubber | 0.005 | 0.025–0.030 | 0.010 |

Figure 5:
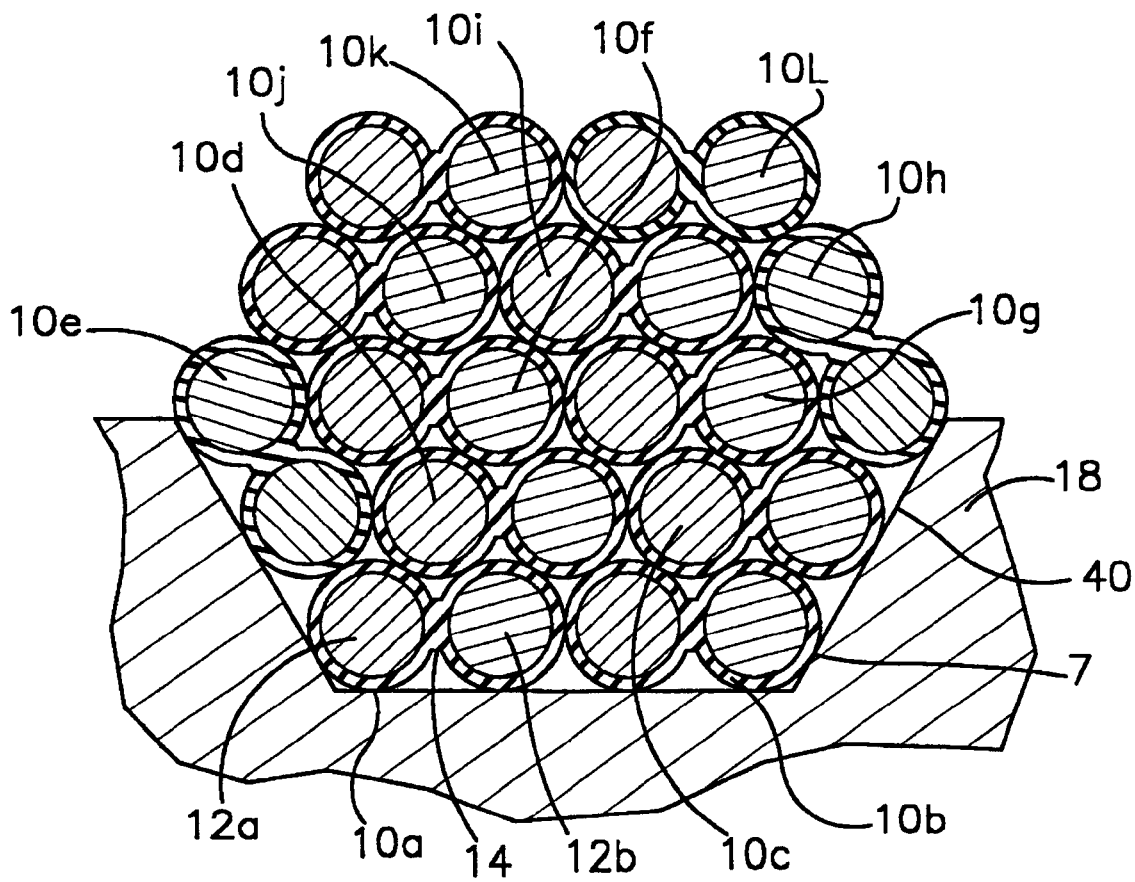
FIG. 5 is a cross-sectional view of a hex tire bead made from a tape according to the present invention.

Using such web sizes, it has been found that the resulting tapes 10 can be positioned at between 135 to 150 degree angles with respect to the majority of tape layers applied to a cylindrical drum in order to allow the tapes to be optimally configured to make the full range of cross-sectional shapes used in various tire bead configurations. For example, FIG. 5 shows a cross-sectional view of a hexagonal shaped tire bead 16 formed by using a tape 10 having two parallel wires 12a,12b embedded in an elastomeric coating. In this example, a tape 10 is wound about a drum 18 so as to form twelve convolutions 10a,10b, . . . 10L of the single tape about the drum 18. These convolutions typically are wound side to side within layers which are build up around the drum to yield the desired cross-sectional shape such as is the hexagonal shaped tire bead 16.

Typically, the tape 10 is wound in a groove 40 formed in the outer circumference of drum 18. First the tape is wound onto the drum 18 at one end of the groove followed by an adjacent winding convolution 10b. Then, the stacking device positions the next convolution 10c above and slightly to the right of convolution 10b so that the left side of the web rests above the web section of convolution 10b. After convolution 10d is applied in the manner just described, the convolution 10e is applied so that one wire is adjacent the second layer and the second wire of convolution 10e begins the third layer. After convolutions 10f and 10g are applied, the convolution 10h is applied to end the third layer and begin the fourth layer. The construction process continues to form the bead shown in FIG. 5. The ability of the tape 10 with the double wires to straddle two layers provides the flexibility for forming a bead having any desired shape including but not limited to a triangular, pentagonal or hexagonal shape. The outside convolutions 10c,10h in the second, third and fourth layers have half convolutions oriented so that a line a—a between the centers of the convolution's parallel wires is at an angle α with respect to comparable line b—b between the centers of the adjoining convolutions in the same layer. While a might be sixty degree for a hexagonal shaped bead, any other angle can be used depending on the final bead shape.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A method of making a tire bead comprising the step of: winding of convolutions of a tape in side by side relation and in successive superposed layers of predetermined widths to provide a tire bead of predetermined cross-sectional area, the tape being two spaced parallel wires each uniformly coated with a resilient elastomeric material and connected by a web of the elastomeric material, the web being sized so that the tape is sufficiently pliable to allow the tape to straddle successive superposed layers.

2. The method of making a tire bead as recited in claim 1, including the step of winding the tape about a drum with the convolutions being laid in side by side relation and in successive superposed layers of predetermined widths and with convolutions spanning superposed layers to provide a tire bead of predetermined cross-sectional area.

3. The method of making a tire bead as recited in claim 2, including the step of winding the tape into a hexagonal cross-sectional shape.

4. A tire bead made by the method of:

winding of convolutions of a tape in side by side relation and in successive superposed layers of predetermined widths to provide a tire bead of predetermined cross-sectional area, the tape being two spaced parallel wires each uniformly coated with a resilient elastomeric material and connected by a web of the elastomeric material, the web being sized so that the tape is sufficiently pliable to allow the tape to straddle successive superposed layers.

5. The tire bead as recited in claim 4 wherein the tire bead is further made by winding the tape about a drum with the convolutions being laid in side by side relation and in successive superposed layers of predetermined widths and with convolutions spanning superposed layers to provide a tire bead of predetermined cross-sectional area.

\* \* \* \* \*